July 21, 1942.  I. G. McCHESNEY  2,290,599
CHEMICAL FEEDING DEVICE
Filed Oct. 11, 1939  3 Sheets-Sheet 1

INVENTOR.
Irvin G. McChesney
BY Green & McCallister
His ATTORNEYS.

July 21, 1942.     I. G. McCHESNEY     2,290,599
CHEMICAL FEEDING DEVICE
Filed Oct. 11, 1939     3 Sheets-Sheet 2

INVENTOR.
Irvin G. McChesney
BY Green & McCallister
His ATTORNEYS

July 21, 1942.   I. G. McCHESNEY   2,290,599
CHEMICAL FEEDING DEVICE
Filed Oct. 11, 1939   3 Sheets-Sheet 3

INVENTOR
Irvin G. McChesney
By Green & McCallister
His Attorneys

Patented July 21, 1942

2,290,599

UNITED STATES PATENT OFFICE 2,290,599

CHEMICAL FEEDING DEVICE

Irvin G. McChesney, Rochester, N. Y.

Application October 11, 1939, Serial No. 298,922

12 Claims. (Cl. 137—78)

This invention relates to an apparatus for controlling the flow of liquids in such a manner that it is either proportional to the quantity of a substance to which the liquids are added (such as water, etc.), or is controlled by another property of the substance (such as hydrogen ion concentration, electrical conductivity, etc.), or is simultaneously controlled by two or more such factors.

In numerous processes it is necessary to add a liquid material to another liquid material which is flowing through a pipe, flume, or tank, in such a manner that the rate of addition of the first liquid is in constant proportion to the rate of flow of the second. An example of this is the addition of a solution of sulphuric acid to water which is being treated to make it suitable for a specific use, such as boiler feedwater. In this example the sulphuric acid may be added to neutralize part of the alkaline constituents in the water and to simultaneously produce sulphates of the alkali or alkaline earth metals which enter into the reaction. Numerous devices which accomplish the proportional addition of a liquid reagent to a larger quantity of another liquid have been invented, and those versed in the art of water treatment are familiar with various means for accomplishing this result. In one class of such devices an orifice or a Venturi tube is inserted in the conduit which conveys the stream of liquid to which a reagent is to be added, and two pipes are connected to these restricting devices in such a manner that the liquids in the pipes are characterized by differences in hydrostatic pressure, according to the known properties of the orifice and the Venturi tube. The two different pressures may be transmitted by the connecting pipes to chambers separated by a flexible diaphragm which, in turn, has a movable rod connected to it in such a manner that the flexing of the diaphragm, in response to changes in pressure, will transmit motion to the rod. The rod may, in turn, be connected to one of a number of known devices which control the flow of the liquid reagent, e. g., a plug valve. The different pressures caused by the flow of liquid through the orifice or Venturi tube may, on the other hand, be transmitted into hydrostatic head or elevations of columns of mercury, and changes in these elevations may be utilized to operate numerous mechanical devices for controlling the flow of a liquid reagent. In addition to proportional flow controlling devices which are based on the measurement of flow by means of an orifice or a Venturi tube, there are numerous other devices for accomplishing the addition of one liquid to another in constant proportion.

In many instances it is not satisfactory to add one liquid to another in a constant proportion, because chemical or physical properties of one of the liquids, or of the mixture of the two, may fluctuate from time to time, requiring that their proportions be varied to produce the desired result. Thus, in the example cited above of the treatment of water with sulphuric acid, it is desirable to produce a mixture having a constant concentration of hydrogen ions, i. e., a constant pH. The flow-responsive reagent controlling device may be adjusted initially to supply the sulphuric acid in the quantities which will give a mixture having the desired pH, and subsequent variations in the composition of the water supply, or in the efficiency with which other treatment is carried out, may cause the proportion of sulphuric acid which has been fixed by adjustment to be unsatisfactory, in that it will fail to produce a mixture having the desired pH. This difficulty can be overcome by connecting the reagent-controlling apparatus with a device which responds to changes in the composition or properties of the treated water, and which does not respond to the volume of flow.

In the example cited, i. e., the addition of sulphuric acid to water, in which it is desired to maintain a constant pH of the mixture, it is possible to measure the pH of the water by inserting electrodes into the water and connecting them to an instrument for measuring the electrical potential difference which exists between the electrodes. This potential difference is a function of the hydrogen ion concentration in the liquid, and when specially prepared electrodes are utilized in a manner well known to those versed in the art of such measurements, and are connected to a properly designed recording potentiometer which has been long used for this and similar purposes, it is possible to obtain a continuous and reasonably accurate record of the hydrogen ion concentration of the liquid. The manufacturers of apparatus for thus measuring and recording the pH of liquids have incorporated within their equipment suitable electrical circuits and contacts for operating a relay when the measured pH differs from a predetermined value which may be fixed by adjustment of the apparatus. The relay may then be connected to a motor or other actuating device which will change the position of a valve or in other manner control the flow of a reagent. By means of such combinations of known devices it is possible to control the flow of the reagent so that the pH of the mixture is reasonably constant.

As set forth above, it is possible by known means to control the rate of flow of one liquid into another liquid so that the proportions of one to the other will remain constant, in which case the rate of flow of the second liquid is measured by a suitable metering device which, in turn, is connected to apparatus which controls the rate of flow of the first liquid. It is also possible to eliminate the metering device and replace it with apparatus which measures various other properties of the mixture, such as the pH, and controls the rate of flow of the second liquid in such a manner as to produce a mixture having the desired characteristics. However, when the second method of controlling the mixture is utilized, the rate of flow of the body of liquid to which the first is added may vary over such a wide range that the flow-controlling device for applying the first liquid cannot respond in such a manner as to produce a mixture having the desired characteristics. Thus, in the example cited, of the addition of sulphuric acid to water at a rate controlled by the measured pH of the mixture, let it be supposed that the rate of flow of the mixture at a given time is 100 gallons per minute, and that the composition of the liquid is such that it is necessary to add 5 cubic centimeters per minute of concentrated sulphuric acid to produce a mixture having the desired pH. Now, suppose that the rate of flow of the mixture increases suddenly to 1000 gallons per minute, so that it is necessary to add 50 cubic centimeters per minute of sulphuric acid in order to produce the desired pH. When the sudden increase in flow occurs the pH of the mixture will change rapidly because the flow of sulphuric acid will be inadequate for the increased amount of water. The pH recording device will respond to this change in composition and will actuate the relay and driving mechanism in such a manner that the rate of flow of sulphuric acid will be increased. However, if this controlling apparatus is designed so that it will increase the rate of flow of sulphuric acid in sufficiently large increments to maintain a constant pH when the rate of flow of the mixture is rapidly increased tenfold, the apparatus is incapable of responding, with the desired sensitivity, to small changes in pH which require small increments in the rate of flow of the acid for their correction. I have found that it is impossible to select an optimum sensitivity and magnitude of response of the measuring and controlling apparatus which will be suitable for the treatment of the water at all rates of flow which might be experienced. It is therefore desirable that the rate of flow of the sulphuric acid shall respond not only to the chemical composition of the water with which the acid is mixed, but that it shall respond also to changes in the rate of flow of the mixture so that immediate adjustment to compensate for such changes may be made by the acid feeding device, and that accurate adjustment of the pH of the mixture may then be effected by the pH recording and controlling apparatus.

The difficulty which has been cited in the control of the flow of sulphuric acid to water, in such a manner as to maintain a mixture of constant pH, when the rate of flow of the mixture may vary widely, is inherent in any process in which liquids are mixed to produce a certain mixture, and the characteristics of the mixture may be changed by one or more variable properties of the liquids, one variable being the rate of flow.

It is one of the objects of my invention to control the rate of flow of a liquid by a device which responds in a desired manner to changes in the rate of flow of a second liquid, or by a device which responds to changes in the properties of the mixture so as to produce a mixture having the desired characteristics, or by a combination of devices designed to control the flow to produce several results, such as proportionality to another liquid as well as the properties of the mixture.

Another object of the invention is to control the flow of a liquid as set forth above by means of simplified apparatus in which the motion of various parts is reduced to a minimum.

A further object of the invention is to provide an improved method of controlling the flow of a reagent or other liquid by means of instruments which measure the pH, electrical conductivity, or other physical or chemical properties of a mixture, in such a manner that the control will produce the desired results in spite of sudden and wide variations in the rate of flow of the mixture. Other and further objects reside in the procedural and structural details hereinafter described and set forth in the appended claims.

I have devised improvements in the art of controlling the flow of liquids to produce a mixture of desired characteristics and have invented an apparatus for carrying out such control. The apparatus is shown in the drawings attached hereto, wherein.

Figure 1B:
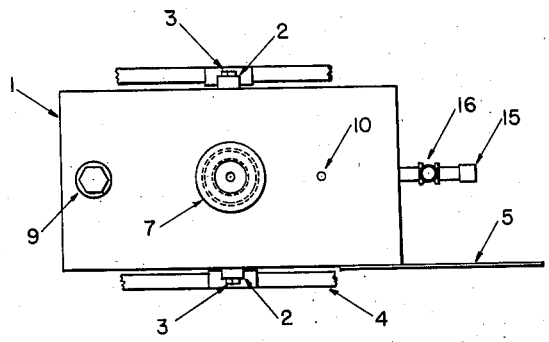
Fig. 1b is a plan view of Fig. 1.

Referring now to the drawings, 1 is a tank containing the liquid whose flow is to be controlled. I prefer to construct this in the form of a cylinder with its axis approximately horizontal and its length somewhat greater than its diameter, as shown, but other shapes may be used. The cylinder is supported by the two bearings 2, 2, which are fastened to it on opposite sides midway between the ends, and which rest upon the knife-edge fulcrums 3, 3, the latter in turn being supported by the frame 4. The cylinder is thus balanced so that it may be tilted through a small angle and the elevation of either end may be raised or lowered. Its position is fixed by the arms 5 and 6 which are connected to one or more controlling devices actuated by apparatus for measuring various conditions of the mixture produced by the flow of the liquid being discharged from tank 1, or any other desired basis of control.

Tube 7 is a means of filling tank 1 with the liquid to be discharged and for admitting air to displace the liquid as it flows from tank 1. Tube 7 is perforated with a small vent at 8 through which the air must enter. Cap 9 is a means of venting the tank when filling it with liquid through tube 7. Tube 10 is a connection to manometer 11 which measures the vacuum produced by the discharge of liquid from the tank, and tube 12 connects to water-jet vacuum pump 13. Pipe 14 carries a supply of liquid to fill the tank 1 and is supported in the mouth of tube 7, which is sufficiently wide so that pipe 14 does not restrict the position of tank 1.

Discharge pipe 15 is connected to one end of tank 1 and is provided with valve 16 and discharge control means such as a small orifice 17, as shown, or a stainless steel needle valve. Means for receiving the liquid discharged from tank 1 are illustrated in funnel 18, pump 19, suction pipe 20, constant head dilution-water supply tank 21, receiving water from the supply pipe 22 through the float-operated valve 23. These several parts provide means for conveying the liquid discharged from tank 1 into the pipe 24, which conveys another liquid, and for injecting the controlled liquid from tank 1 through the perforated nozzle 25 preceding the mixing baffles 26. The receiving funnel 18 and subsequently specified parts are not per se a part of the invention, and in their place any desired combination of known devices may be used to receive the liquid discharged from tank 1 and cause it to be utilized in any desired manner.

I have shown in the drawings, for purpose of illustration, means for measuring the pH value of the liquid flowing through pipe 24, consisting of sampling pipe 27, electrolytic cell 28, connecting wires 29, recording potentiometer 30, current controller 31, and motor-operated lever arm 32 connected with a floating lever 39. These devices are well known to those versed in the art of measuring the pH value of liquids and transmitting such measurements to the control of mechanical devices, and are not claimed per se as part of the invention. They may be replaced, for other purposes, by known devices for measuring the electrical conductivity or other characteristics of the liquid flowing through pipe 24, and means for transmitting such measurements to mechanical motion.

I have also shown in the drawings, for the purpose of illustration, means for measuring the rate of flow of the liquid flowing through pipe 24, consisting of orifice 33 connected to pilot valve 34, which controls the flow of air through tubes 35 and the pressure exerted on diaphragm meter 36, thus transmitting the pressure on both sides of orifice 33 to the diaphragm meter 36. The diaphragm is connected by mechanical linkage to arm 37, which is in turn connected by arm 38 to the floating lever 39 so that the latter is caused to move to a position fixed, on the one hand, by these pressures and therefore by the quantity of water flowing through pipe 24 and, on the other hand, by the pH value, as described above. These devices for measuring the flow of liquid and transmitting such measurements to the motion of arm 39 are well known to those familiar with the art of flow measurement and are not claimed per se as part of the invention. They may be replaced by any other type of known measuring devices suitable for controlling the mechanical motion of one member such as arm 39.

Figures 1, 1A:
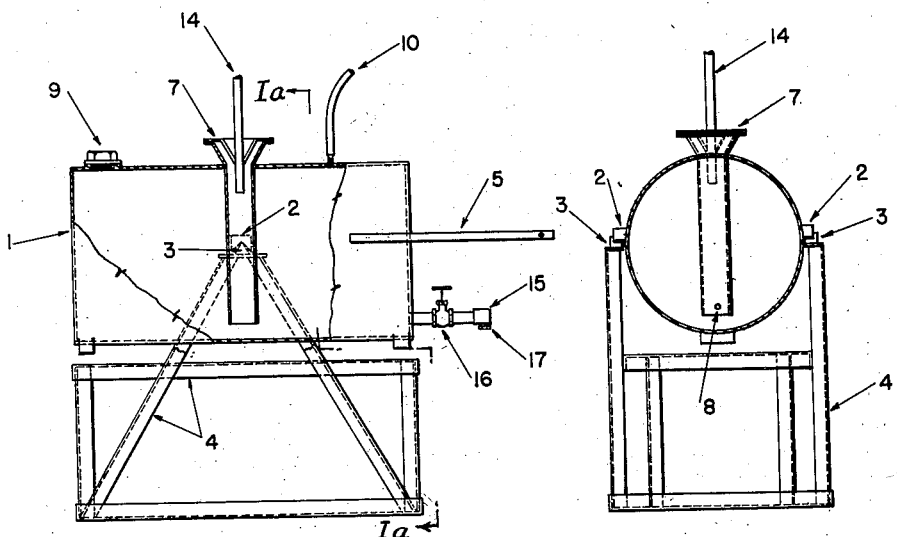
Figure 1 is an elevational view partly in section of a preferred embodiment of apparatus according to the invention.
Fig. 1a is a sectional view taken along the line Ia—Ia of Fig. 1.
Figure 2:
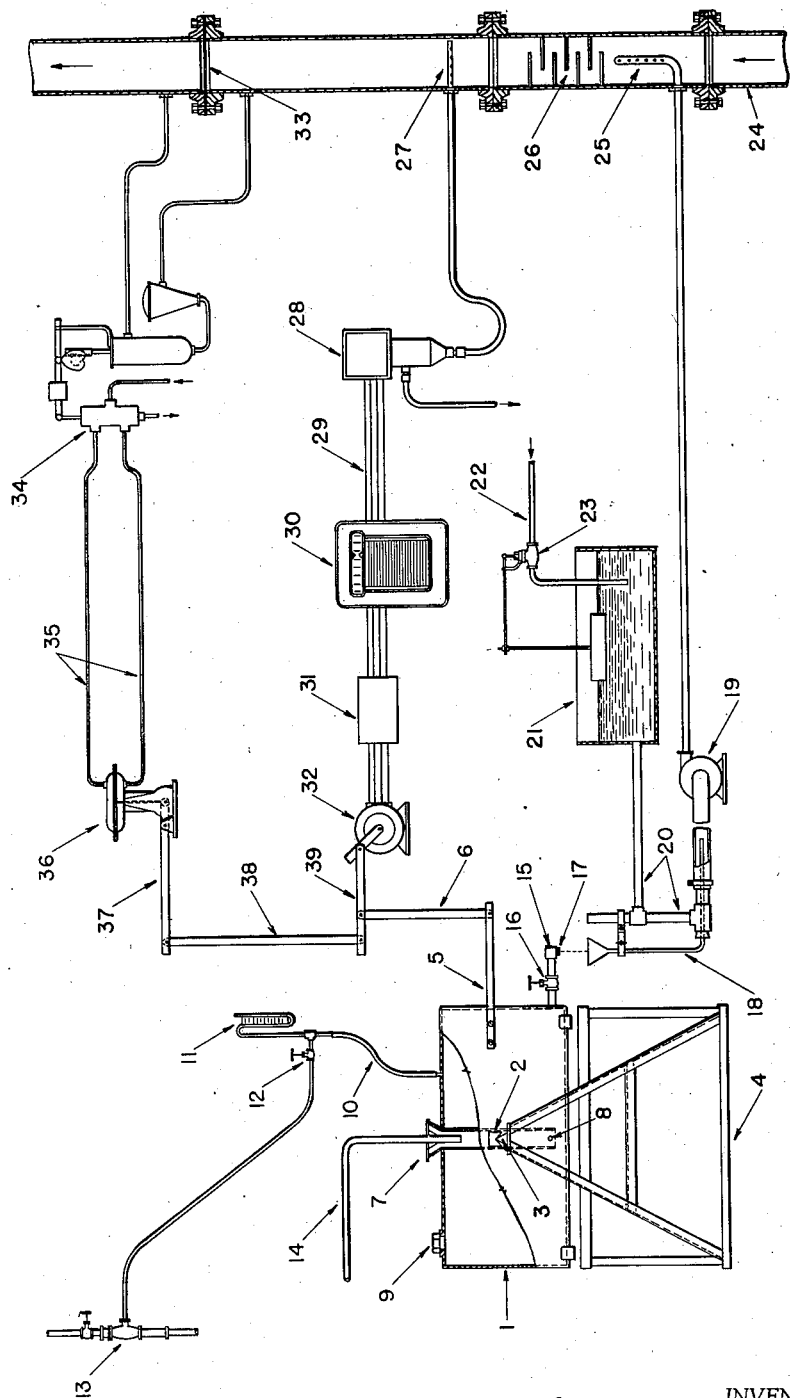
Fig. 2 is a diagrammatic view illustrating how the characteristics of the mixture are measured and the control of the liquid flow governed thereby.

In the operation of the invention in the form illustrated in Figs. 1 and 2, tank 1 is filled with the desired liquid by removing cap 9 and discharging the liquid through pipe 14 into tube 7. When the tank is nearly full, cap 9 is replaced and suction is applied by means of water-jet pump 13 so that the air above the liquid in tank 1 is drawn off through tube 10, the liquid rises to replace it, and the level of the liquid in tube 7 is lowered until orifice 8 is exposed so that air may enter the tank through this orifice. Valve 12 may then be closed, disconnecting tank 1 from water-jet pump 13. Valve 12 may, however, be left open to continuously apply the suction of pump 13 to tank 1 in order to prevent any loss of vacuum due to a possible leakage of air into the upper portion of the tank. The pressure of the liquid at the orifice 17 in discharge pipe 15 is thereafter proportional to the difference in elevation between this orifice and the level of the liquid in tube 7. The level of the liquid in tube 7 will remain slightly above air-vent orifice 8 until it is drawn down, by discharge through pipe 15, to permit a bubble of air to enter the tank to displace the liquid removed. The pressure of the air above the liquid will increase as the elevation of the liquid is lowered, until when the liquid has been drained down to the air-vent orifice 8 the pressure of the air above it will equal barometric pressure. Manometer 11 will therefore, when properly calibrated, measure the quantity of liquid remaining in tank 1 and is preferably provided with a valve (not shown) to prevent loss of liquid. Manometer 11 will also measure the quantity of liquid in the tank when a small constant suction is left in the tank to compensate for tank leakage.

The relative elevations of orifice 17 and the level of the liquid in tube 7 are changed by tilting the tank 1 on the knife-edges 3. This is done by arm 5, the position of which is fixed by the control devices described herein. Since the rate of flow of liquid from tank 1 through orifice 17 is a function of the head of the liquid above the orifice, this flow can be varied by tilting the tank and will depend at all times on the position of arm 5.

In the arrangement of apparatus illustrated in Figs. 1 and 2 of the drawings, let it be supposed that the liquid in tank 1 is sulphuric acid added to the liquid flowing through pipe 24 for the purpose of changing the pH value of the latter liquid and maintaining it at some desired value. Let it be further supposed that the sample of the mixture drawn through tube 27 and electrolytic cell 28 is shown by the potentiometer 30 to have a pH value higher than the desired value. Potentiometer 30 thereupon actuates current-controller 31 in such a manner that lever arm 32 is moved downward by its driving motor. This downward motion is transmitted by lever 39 and arm 6 to arm 5, causing tank 1 to tilt so that orifice 17 is lowered in relation to the level of the liquid in tube 7. This causes the rate of flow of the acid through orifice 17 to increase, thereby decreasing the pH value of the liquid flowing through pipe 24 and correcting the difference between the measured pH value and the desired pH value. If, however, the pH value of the mixture should become lower than desired, the sequence of events cited above will occur in a reverse direction so as to correct the pH value upward.

Let it now be supposed that the rate of flow of liquid through pipe 24 is greatly increased, and that the rate of flow of acid through orifice 17 is insufficient to bring the mixture to the desired pH value. The pressure difference across orifice 33 is increased as a function of the increased flow, and this pressure difference exerted on the diaphragm of meter 36 causes the arm 37 to move downward. This downward motion is transmitted to arm 5 because of the linkage through lever arm 38, and the resultant tilting of tank 1 causes orifice 17 to be lowered with respect to the level of the liquid in tube 7. This causes the rate of flow of acid through orifice 17 and thence to the liquid flowing through pipe 24 to be increased, as required by the increased flow of the mixture. The pH value is thereby corrected downward as required. If, however, the rate of flow of liquid through pipe 24 should be decreased, the sequence cited above will take place in reverse direction, causing the end of the floating lever 39 to be raised by the orifice meter 36.

By this arrangement the quantity of acid injected into the liquid flowing through pipe 24 is increased or decreased under the control of both the rate of flow of the liquid and the pH value measured by potentiometer 30 and accessory parts. Sudden changes in flow are thus compensated for by appropriate changes in rate of acid addition, and changes in characteristics of the liquid are compensated for by control of the treatment by pH measuring devices. Whereas in some cases neither of these controlling mechanisms, taken alone, would be capable of producing a mixture of the desired constancy of pH, the compounding of the two mechanisms provides means for maintaining a sufficiently constant pH value.

Figure 3:
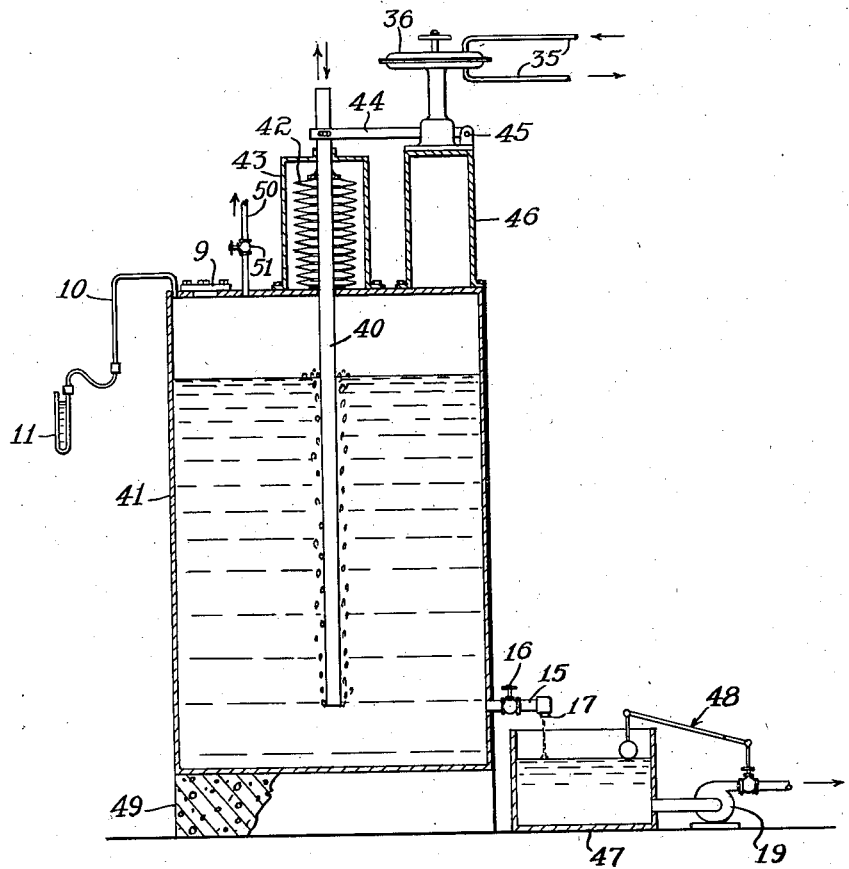
Fig. 3 is a partial elevational view of a modified embodiment of this invention.

In Fig. 3 I have illustrated a modification of the present invention which embodies the same principle of liquid head control as already described in connection with Figs. 1 and 2, but in Fig. 3 I have illustrated a specifically different form of apparatus by which the present results may be for many purposes equally well secured. In the modified form of the invention I provide a movable head controller tube 40 sealed to the top of the tank 41 within the bellows, gland or other sealing device 42 which is disposed within a suitable framework or housing 43. The head controller tube is operatively connected as shown to a lever arm 44 fulcrumed at one end at 45 and operatively associated with a diaphragm regulator 36 of the type already referred to and which will be more fully understood from a consideration of Fig. 2. This diaphragm regulator is provided with the connecting tubes 35 which lead to and from air loading control means and other equipment (not illustrated in Fig. 3) such as is shown in the right-hand portion of Fig. 2. This diaphragm regulator is mounted at the required height by supporting it on a framework 46.

The tank 41 is, like tank 1, provided with a removable filling cap 9 and a connection 10 to a manometer or other liquid level indicator designated by the numeral 11. It will be appreciated that the head controller tube has limited vertical up-and-down movement, as indicated by the arrows superjacent thereto.

The tank 41 is provided near its bottom with a valved discharge pipe 15 having a suitable orifice or valve 17 at the terminus thereof as already described in connection with Figs. 1 and 2, but in the present case the liquid from the orifice is received directly within a receiving tank 47 near the bottom of which a centrifugal pump 19 is connected thereinto, as will be understood from the previous description. The pump educt is provided with a float regulating means designated as 48 to control pump discharge, and this operates in response to the liquid level within receiving tank 47, as will be appreciated. Dilution water is supplied to tank 47 in a similar manner as to tank 21 of Fig. 2.

The tank 41 is supported on any appropriate base such as that designated at 49 and is evacuated, i. e., is under negative pressure above the liquid level therein. The vacuum may be maintained by a tight seal and/or by the continuous operation of the priming line 50, valved at 51, at the top of the tank which leads to a syphon or to some other vacuum-producing agency.

The foregoing description is intended as illustrative rather than limitative, and within the terms and scope of the appended claims I may effect certain modifications, substitutions, additions and omissions such as will be understood by those versed in this field without departing from the principles herein set forth. For instance, the orifice for discharge of the liquid from tank 1 may be fixed instead of movable, and the pressure of the liquid above the orifice may be varied by changing the elevation of the air inlet orifice 8.

Furthermore, in the use of the invention it is also possible to control the relative elevation of the liquid and the orifice by response to a single characteristic of another substance, such as its rate of flow, instead of compounding or correlating the effect of measurements of two or more characteristics. Such control, although not described specifically in the foregoing example, is also within the scope of the invention as a modification thereof.

Having thus described the invention, that which I claim as new and desire to secure by Letters Patent is:

1. A feeding device for controlling the flow of a liquid which comprises a closed storage tank for said liquid, discharge control means for discharging liquid from said tank, means for predetermining the effective head above said discharge control means by maintaining the pressure in said tank at some vertical distance above said discharge control means at atmospheric pressure, measuring means for measuring at least one condition of another material, and means actuated by said measuring means to change said vertical distance.

2. A feeding device for controlling the flow of a liquid which comprises a closed storage tank for said liquid, discharge control means for discharging liquid from said tank, means for predetermining the effective head above said discharge control means by maintaining the pressure on the liquid at some level in said tank below the existing liquid level at atmospheric pressure depending on the setting of said maintaining means, said discharge control means and said maintaining means being relatively adjustable, measuring means for measuring at least one condition of another material, and means actuated by said measuring means to change the relative adjustment of said discharge control means and said maintaining means.

3. A feeding device for controlling the flow of a liquid which comprises a closed storage tank for liquid, discharge control means for the liquid connected with the lower portion of said tank, means including a tube for predetermining the effective head above said discharge control means, said tube having one end communicating with the inside of said tank above its bottom and the other end communicating with the atmosphere, a meter for measuring the rate of flow of another liquid, and means actuated by said meter to change the vertical distance between said discharge control means and said one end of said tube.

4. In the combination of claim 3, a device for measuring the pH value of said other liquid, said actuated means being actuated by said measuring device co-jointly with said meter.

5. A feeding device for controlling the discharge of a liquid which comprises a closed storage tank for the liquid, pivot means for said tank having a horizontal axis, discharge control means in communication with the lower portion of said tank and located a substantial horizontal distance from a vertical plane through said axis, a tube substantially in said vertical plane and extending from a point above the bottom of said tank upwardly through the top of said tank so as to communicate with the atmosphere, means for producing sufficient vacuum in the upper portion of said tank to draw air through said tube, and means for tilting said tank about said axis.

6. A feeding device for controlling the discharge of a liquid which comprises a closed storage tank for the liquid, pivot means for said tank having a horizontal axis, discharge control means in communication with the lower portion of said tank and located a substantial horizontal distance from a vertical plane through said axis, a tube substantially in said vertical plane and extending from a point above the bottom of said tank upwardly through the top of said tank so as to communicate with the atmosphere, means for producing sufficient vacuum in the upper portion of said tank to draw air through said tube, a meter for measuring the rate of flow of another liquid, and means actuated by said meter for tilting said tank about said axis.

7. A feeding device for controlling the discharge of a liquid which comprises a closed storage tank for the liquid, pivot means for said tank having a horizontal axis, discharge control means in communication with the lower portion of said tank and located a substantial horizontal distance from a vertical plane through said axis, a tube substantially in said vertical plane and extending from a point above the bottom of said tank upwardly through the top of said tank so as to communicate with the atmosphere, means for producing sufficient vacuum in the upper portion of said tank to draw air through said tube, a meter for measuring the rate of flow of another liquid, a device for measuring a condition of said other liquid other than rate of flow, and means actuated co-jointly by both said meter and said measuring device for tilting said tank about said axis.

8. The combination of claim 7 wherein said condition is the pH value of said other liquid.

9. A feeding device for controlling the discharge of a liquid which comprises a closed storage tank for the liquid, pivot means for said tank having a horizontal axis, discharge control means in communication with the lower portion of said tank and located a substantial horizontal distance from a vertical plane through said axis, a tube substantially in said vertical plane and extending from a point above the bottom of said tank upwardly through the top of said tank so as to communicate with the atmosphere, means for producing sufficient vacuum in the upper portion of said tank to draw air through said tube, a meter for measuring the rate of flow of another liquid, a measuring device for measuring a condition of said other liquid other than rate of flow, a floating lever having a point moved by said meter and a second point moved by said measuring device, and means moved by a third point on said lever for tilting said tank about said axis.

10. The combination of claim 9 wherein said condition is the pH value of said other liquid.

11. A feeding device for controlling the flow of a liquid which comprises a closed storage tank for the liquid, discharge control means for discharging liquid from said tank, a vertically movable head controller for controlling the head of chemical solution above said discharge control means, measuring means for measuring at least one condition of another material, and means actuated by said measuring means for changing the elevation of said movable head controller.

12. A method of controlling the flow of liquid from a closed tank having discharge control means which comprises predetermining the effective head of liquid above said discharge control means by maintaining the pressure on the liquid at some level in said tank below the existing liquid level at atmospheric pressure, and adjusting in accordance with a function of at least one condition of another material the elevation of at least one of the two following—said first named level and said discharge control means.

IRVIN G. McCHESNEY.